US011090565B2

(12) United States Patent
Vennam et al.

(10) Patent No.: US 11,090,565 B2
(45) Date of Patent: Aug. 17, 2021

(54) USER-SPECIFIC RECAP FOR COMPUTER-GENERATED INTERACTIVE ENVIRONMENTS

(71) Applicant: International Business Machines Corporation, Armonk, NY (US)

(72) Inventors: Saikrishna Vennam, Durham, NC (US); Ramratan Vennam, Durham, NC (US); Belinda M. Vennam, Durham, NC (US); Spencer T. Reynolds, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 16/183,588

(22) Filed: Nov. 7, 2018

(65) Prior Publication Data

US 2020/0139253 A1 May 7, 2020

(51) Int. Cl.
*A63F 13/79* (2014.01)
*H04L 29/06* (2006.01)

(52) U.S. Cl.
CPC .............. *A63F 13/79* (2014.09); *H04L 67/38* (2013.01)

(58) Field of Classification Search
CPC ........ A63F 13/77; A63F 13/65; A63F 13/537; A63F 13/828; A63F 13/79; G06N 20/00; H04L 43/16; H04L 67/14; H04L 43/06; H04L 43/08
See application file for complete search history.

(56) References Cited

U.S. PATENT DOCUMENTS

| 9,089,777 | B2 | 7/2015 | Chimes et al. |
| 10,389,607 | B1* | 8/2019 | Borovikov .......... H04L 12/1822 |
| 10,576,380 | B1* | 3/2020 | Beltran .................... A63F 13/77 |
| 2006/0148571 | A1 | 7/2006 | Hossack et al. |
| 2007/0294089 | A1* | 12/2007 | Garbow ............. G06Q 30/0216 705/26.1 |
| 2010/0190555 | A1 | 7/2010 | Dutilly et al. |

(Continued)

OTHER PUBLICATIONS

"Nonlinear gameplay", Wikipedia, This is an old revision of this page, as edited by 201.69.126.61 (talk) at 23:04, Apr. 5, 2018, 6 pages, Retrieved from <https://en.wikipedia.org/w/index.php?title=Nonlinear_gameplay&oldid=834478531>.

*Primary Examiner* — Yingchuan Zhang
(74) *Attorney, Agent, or Firm* — Aaron N. Pontikos; William H. Hartwell (57) ABSTRACT

A method includes logging, at a processor, user-performed actions in a computer-generated interactive environment. The method also includes determining statistics of the user-performed actions. The statistics indicate at least a frequency of each particular type of user-performed action and a sequential order of the user-performed actions. The method further includes accessing a data structure that includes a plurality of nodes. Each node of the plurality of nodes corresponds to a choice presented within the computer-generated interactive environment. The method also includes linking different nodes of the plurality of nodes based on the statistics to generate sequential action data and applying a set of rules to at least a portion of the statistics to generate character profile data. The method further includes generating a recap of the user-performed actions based on the sequential action data and the character profile data.

15 Claims, 7 Drawing Sheets

(56) References Cited

U.S. PATENT DOCUMENTS

| | | |
|---|---|---|
| 2014/0075309 A1 | 3/2014 | Dingsor et al. |
| 2014/0075312 A1 | 3/2014 | Dingsor et al. |
| 2015/0375117 A1* | 12/2015 | Thompson .......... H04N 21/254 463/9 |
| 2017/0157512 A1 | 6/2017 | Long et al. |
| 2017/0266568 A1 | 9/2017 | Lucas et al. |

* cited by examiner

USER-SPECIFIC RECAP FOR COMPUTER-GENERATED INTERACTIVE ENVIRONMENTS

BACKGROUND

The present disclosure is generally related to computer-generated interactive environments, and more specifically, to a user recap for a computer-generated interactive environment.

SUMMARY

According to one implementation of the present disclosure, a method includes logging, at a processor, user-performed actions in a computer-generated interactive environment. The method also includes determining statistics of the user-performed actions. The statistics indicate at least a frequency of each particular type of user-performed action and a sequential order of the user-performed actions. The method further includes accessing a data structure that includes a plurality of nodes. Each node of the plurality of nodes corresponds to a choice presented within the computer-generated interactive environment. The method also includes linking different nodes of the plurality of nodes based on the statistics to generate sequential action data and applying a set of rules to at least a portion of the statistics to generate character profile data. The method further includes generating a recap of the user-performed actions based on the sequential action data and the character profile data.

According to another implementation of the present disclosure, an apparatus includes a memory and a processor coupled to the memory. The processor is configured to log user-performed actions in a computer-generated interactive environment. The processor is also configured to determine statistics of the user-performed actions. The statistics indicate at least a frequency of each particular type of user-performed action and a sequential order of the user-performed actions. The processor is also configured to access a data structure that includes a plurality of nodes. Each node of the plurality of nodes corresponds to a choice presented within the computer-generated interactive environment. The processor is also configured to link different nodes of the plurality of nodes based on the statistics to generate sequential action data and apply a set of rules to at least a portion of the statistics to generate character profile data. The processor is also configured to generate a recap of the user-performed actions based on the sequential action data and the character profile data.

According to another implementation of the present disclosure, a computer program product for generating a user-specific recap includes a computer readable storage medium having program instructions embodied therewith. The program instructions are executable by a processor to cause the processor to log, by the processor, user-performed actions in the computer-generated interactive environment. The program instructions are executable by a processor to cause the processor to determine, by the processor, statistics of the user-performed actions. The statistics indicate at least a frequency of each particular type of user-performed action and a sequential order of the user-performed actions. The program instructions are executable by a processor to cause the processor to access, by the processor, a data structure that includes a plurality of nodes. Each node of the plurality of nodes corresponds to a choice presented within the computer-generated interactive environment. The program instructions are executable by a processor to cause the processor to link, by the processor, different nodes of the plurality of nodes based on the statistics to generate sequential action data and to apply a set of rules to at least a portion of the statistics generate character profile data. The program instructions are executable by a processor to cause the processor to generate, by the processor, a recap of the user-performed actions based on the sequential action data and the character profile data.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 3, multiple nodes are illustrated and associated with reference numbers 302A, 302B, etc. When referring to a particular one of these nodes, such as the node 302A, the distinguishing letter "A" is used. However, when referring to any arbitrary one of these nodes or to these nodes as a group, the reference number 302 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Computer-generated interactive environments are becoming increasingly complex and provide users with multiple options while navigating through the environments. As a non-limiting example, modern video game designs are becoming increasingly complex, offering branching storylines and numerous side quests. With so many things to experience, it is easy for a player to become overwhelmed with the amount of freedom and flexibility provided. In contrast to traditional game design where players are forced through discrete and linear levels to progress through a game, many modern video games feature a more open-ended game design where story events can occur out-of-order depending on how the player interacts with the game design.

Because of the complexity of many modern gaming designs, an extended absence from game play can result in disorientation and a lack of direction upon a user's return, causing frustration and decreasing motivation to continue playing the game. For example, the player may have forgotten what was happening in the storyline, what important objectives are to be accomplished, etc. Faced with these challenges for continuing game play, many players may opt instead to stop playing the game entirely, severely impacting their enjoyment, satisfaction, and value derived from the game.

The techniques described herein enable a system, such as a video game console, to identify a user's preferred play style, habits, and mechanics. For example, a system can include an action logger that tracks various actions performed by the user while playing a video game. In addition to tracking which buttons the user presses, the action logger can track movement preferences of the user, combination preferences of the user, item choices, and avatar specialization. The system can access a decision tree associated with the video game that outlines the possible specialization routes and user preferences. Different actions tracked by the action logger represent different forks in the decision tree. As a non-limiting example, if the user chooses to drive as opposed to walking at a particular step in the video game, the choice would represent a fork in the decision tree and the user decision would be tracked by the action logger. As the actions are performed by the user and tracked by the action logger, the decision tree is traversed and becomes increasingly accurate in representing the user's preferences.

In scenarios where the user stops playing the video game for an extended period of time, a quick tutorial (e.g., recap) is generated based on the decision tree representing the user's preferences. For example, each decision in the decision tree is assigned a weight and each action performed by the user is assigned a weight based on the number of times the user used that action. A combination of the highest weighted decisions and the highest weighted actions are used to create the tutorial or a recap. For example, within the tutorial, the user can be reminded of the combinations that were preferred to navigate through the video game, itemization choices used in customizing a character, etc. By using the decision tree constructed for the user, the tutorial can help a user quickly immerse back into the video game after the extended period of time.

One advantage of the above-described implementation is generation of a quick tutorial of a video game. The tutorial is constructed based on various decision trees indicating a user's preference. To illustrate, the decision trees outline different specialization routes and user preferences within the video game. As different user-performed actions are performed and logged, the decision trees are traversed and become increasingly accurate in representing the user's preferences. Because some decisions in the video game are of particular importance, such as character specialization decisions, decisions of the decision tree are weighted differently. The highest weighted decisions are used to generate the tutorial. The tutorial can help the user quickly immerse back into the video game after an extended absence. Additionally, the features, functions, and advantages that have been described can be achieved independently in various implementations or may be combined in yet other implementations, further details of which are disclosed with reference to the following description and drawings.

Figure 1:
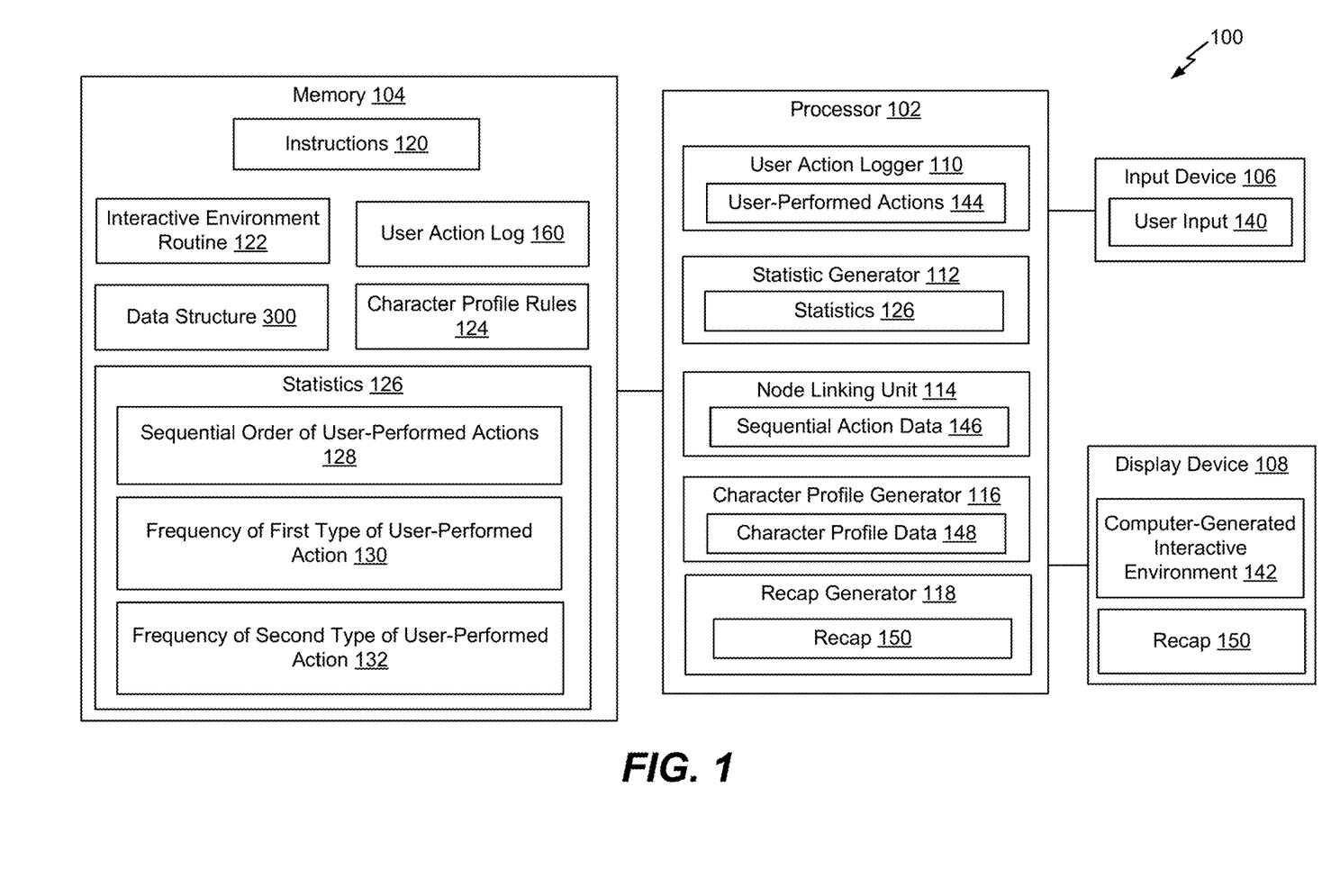
FIG. 1 is a diagram of a system that is operable to summarize actions performed in a computer-generated interactive environment.

FIG. 1 is a diagram of a system 100 that is operable to summarize actions performed in a computer-generated interactive environment. The system 100 includes a processor 102, a memory 104 coupled to the processor 102, an input device 106 coupled to the processor 102, and a display device 108 coupled to the processor 102. The memory 104 is a non-transitory computer-readable storage device that includes instructions 120. The instructions 120 are executable by the processor 102 to perform operations described herein. The processor 102 includes a user action logger 110, a statistic generator 112, a node linking unit 114, a character profile generator 116, and a recap generator 118.

The processor 102 is configured to execute an interactive environment routine 122 to generate a computer-generated interactive environment 142. The computer-generated interactive environment 142 is displayed at the display device 108. The computer-generated interactive environment 142 can correspond to a video game, a training simulation, a historic recreation, etc. In FIG. 1, the interactive environment routine 122 is stored at the memory 104 and the processor 102 retrieves the interactive environment routine 122 from the memory 104. However, in other implementations, the interactive environment routine 122 can be stored remotely, such as at a remote server. For example, the processor 102 can go "online" to access the interactive environment routine 122. According to another implementation, the interactive environment routine 122 can be stored on a disk. For example, the interactive environment routine 122 can be included in a video game disk.

Figure 2:
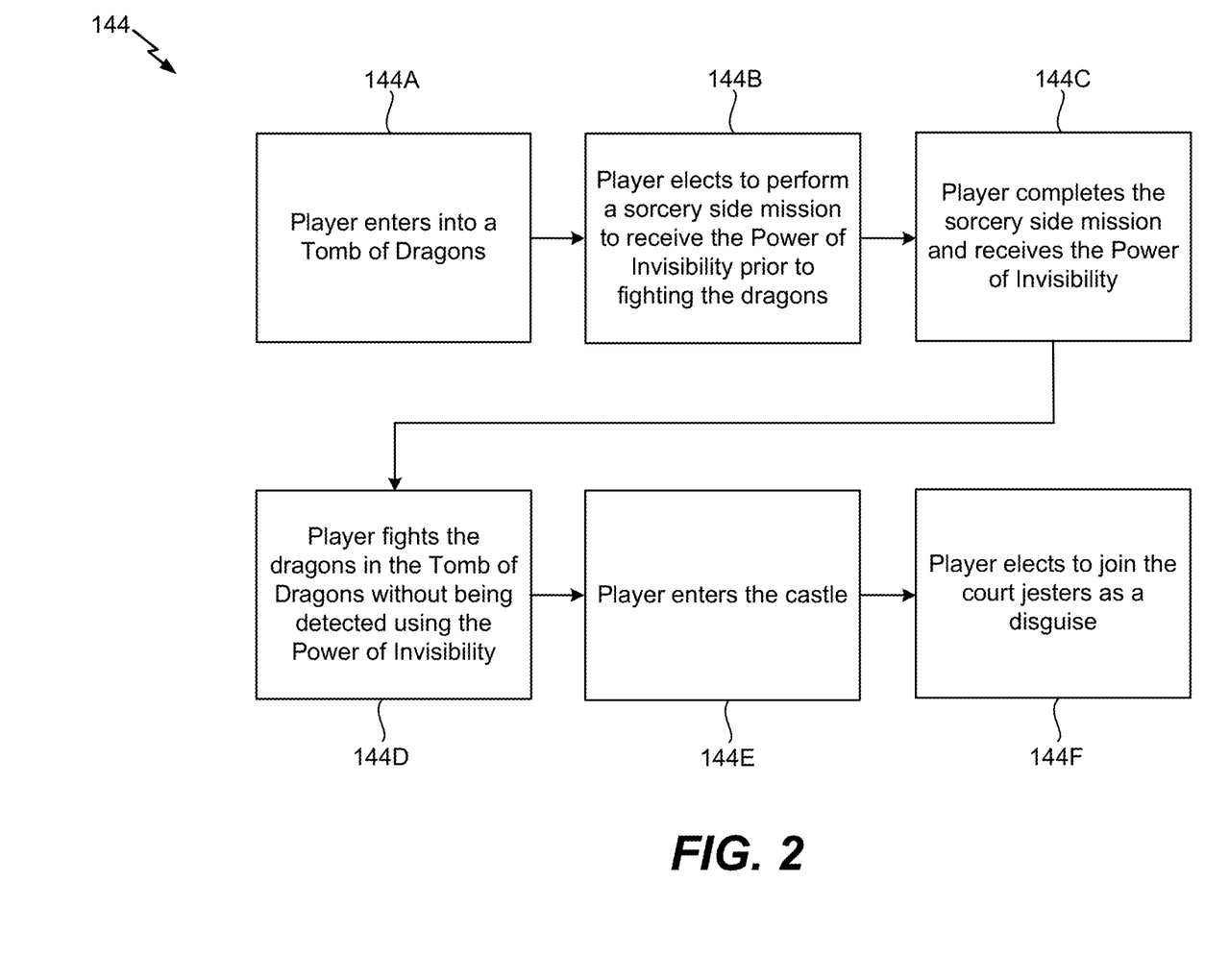
FIG. 2 is an example of user-performed actions that are logged by a user action logger.

The input device 106 is configured to receive user input 140 from a user. As a non-limiting example, the input device 106 can be a controller that is used by the user to perform actions (e.g., user-performed actions 144) within the computer-generated interactive environment 142 (e.g., the video game). Referring to FIG. 2, a non-limiting example of the user-performed actions 144 is shown. It should be understood that the user-performed actions 144 are merely for illustrative purposes. In FIG. 2, a first user-performed action 144A of the user-performed actions 144 includes the player entering into a "Tomb of Dragons." A second user-performed action 144B of the user-performed actions 144 includes the player electing to perform a sorcery side mission to receive the Power of Invisibility. A third user-performed action 144C of the user-performed actions 144 includes the player completing the sorcery side mission and receiving the "Power of Invisibility." A fourth user-performed action 144D of the user-performed actions 144 includes the player fighting the dragons in the "Tomb of Dragons" without being detected using the "Power of Invisibility." A fifth user-performed action 144E of the user-performed actions 144 includes the player entering the castle, and a sixth user-performed action 144F of the user-performed actions 144 includes the player electing to join the court jesters as a disguise. The user action logger 110 is configured to log the user-performed actions 144 in the computer-generated interactive environment 142. For example, the user action logger 110 can log the user-performed actions 144 in "real-time" to create a user action log 160 that is stored at the memory 104.

The statistics generator 112 is configured to determine statistics 126 of the user-performed actions 144. For example, the statistics generator 112 can access the user action log 160 from the memory 104 and generate the statistics 126 from the user-performed actions 144 recorded in the user action log 160. To illustrate, the statistics generator 112 can determine a sequential order of the user-performed actions 128. The sequential order of the user-performed actions 128 can indicate that the second user-performed action 144B was performed after the first user-performed action 144A, the third user-performed action 144C was performed after the second user-performed action 144B, etc.

The statistics generator 112 can also determine a frequency of each particular type of user-performed action. According to one implementation, if a first type of user-performed action corresponds to the player activating the "Power of Invisibility" as indicated in the fourth user-performed action 144D, the statistics generator 112 can determine a frequency of the first type of user-performed action 130. For example, the frequency of the first type of user-performed action 130 can indicate how many times the player activated the "Power of Invisibility." According to another implementation, if a second type of user-performed action corresponds to the player using a court jester disguise as indicated in the sixth user-performed action 144F, the statistics generator 112 can determine a frequency of the second type of user-performed action 132. For example, the frequency of the second type of user-performed action 132 can indicate how many times the player used a court jester disguise while navigating through the computer-generated interactive environment 142.

Figure 3:
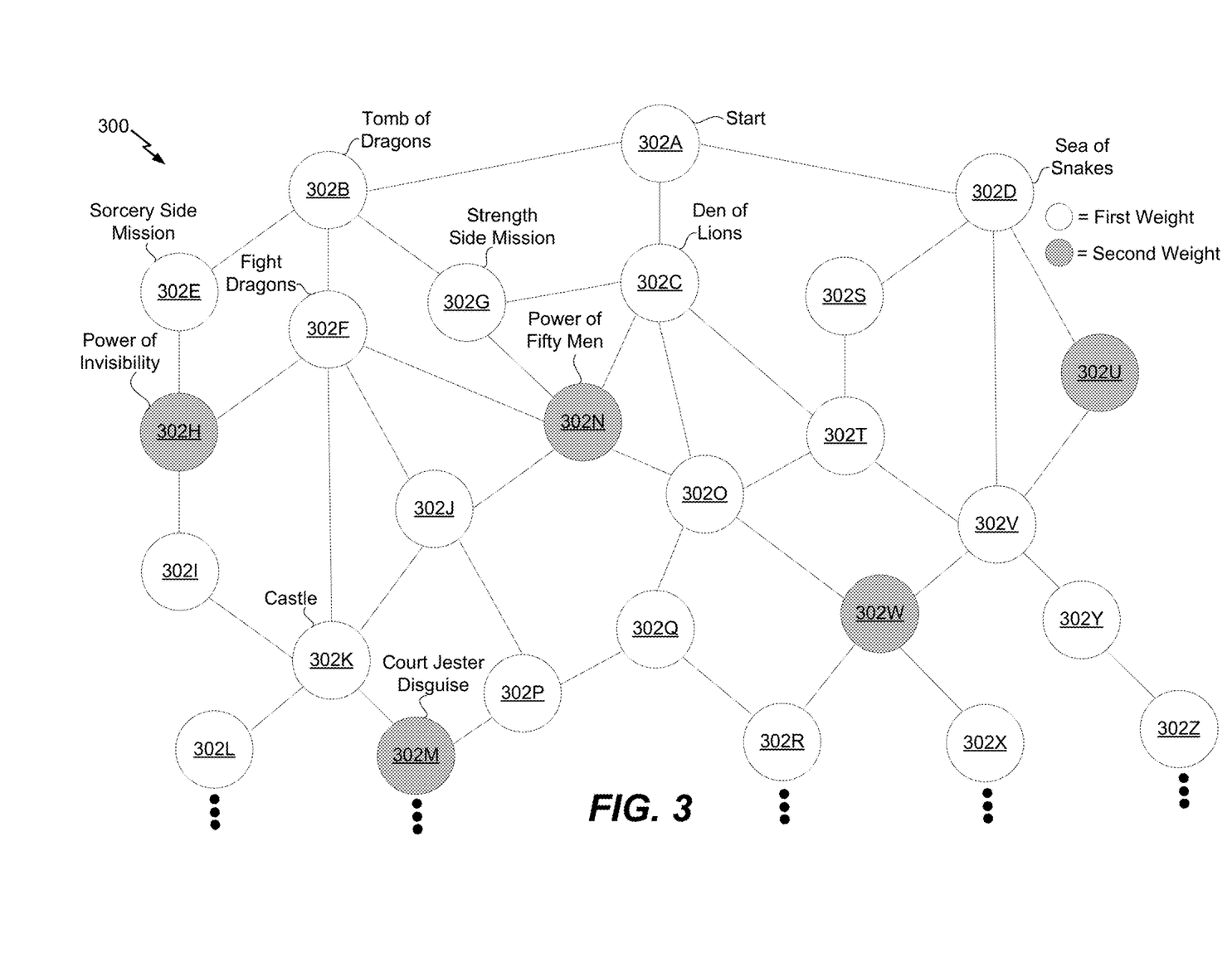
FIG. 3 is an example of a data structure that includes a plurality of nodes.

The processor 102 is configured to access a data structure 300. According to one implementation, the data structure 300 corresponds to a decision tree. Referring to FIG. 3, a non-limiting example of the data structure 300 is shown. The data structure 300 includes a plurality of nodes 302. Each node 302A-302Z of the plurality of nodes 302 can correspond to a decision within the computer-generated interactive environment 142 that is made based on a corresponding user-performed action 144. The design and the decisions illustrated in the data structure 300 are merely for illustrative purposes and should not be construed as limiting.

According to FIG. 3, at node 302A, the user can decide to enter into the "Tomb of Dragons", the "Den of Lions", or the "Sea of Snakes." If the user decides to enter into the "Tomb of Dragons", the data structure 300 branches to node 302B. If the user decides to enter into the "Den of Lions", the data structure 300 branches to node 302C. If the user decides to enter into the "Sea of Snakes", the data structure 300 branches to node 302D. As indicated by the first user-performed action 144A in the user action log 160, the user decides to enter into the "Tomb of Dragons."

At node 302B, the user can decide to perform a sorcery side mission, fight the dragons without performing a side mission, or perform a strength side mission. If the user decides to perform the sorcery side mission, the data structure 300 branches to node 302E. If the user decides to fight the dragons without performing a side mission, the data structure 300 branches to node 302F. If the user decides to perform the strength side mission, the data structure 300 branches to node 302G. As indicated by the second user-performed action 144B in the user action log 160, the user elects to perform the sorcery side mission.

At node 302E, the user can decide whether to complete the sorcery side mission to receive the "Power of Invisibility" at node 302H or whether re-enter the "Tomb of Dragons" at node 302B without completing the side mission. Based on the third user-performed action 144C in the user action log 160, the user completes the sorcery side mission and receives the "Power of Invisibility." At node 302H, the user can decide whether to fight the dragons using the "Power of Invisibility" or proceed to another task. If the user decides to fight the dragons using the "Power of Invisibility", the data structure 300 branches to node 302F. If the user instead decides to proceed to another task, the data structure 300 branches to node 302I. As indicated by the fourth user-performed action 144D in the user action log 160, the user fights the dragons using the "Power of Invisibility."

At node 302F, the user can decide whether to enter into a castle or whether to proceed to another task. If the user decides to enter into the castle, the data structure 300 branches to node 302K. If the user decides to proceed to another task, the data structure 300 branches to node 302J or to node 302N. As indicated by the fifth user-performed action 144E in the user action log 160, the user enters the castle. At node 302K, the user can decide whether to join the court jesters, at node 302M, as a disguise or whether to proceed to another task, as indicated by the nodes 302I, 302J, 302L. As indicated by the sixth user-performed action 144F in the user action log 160, the user elects to join the court j esters.

Figure 4:
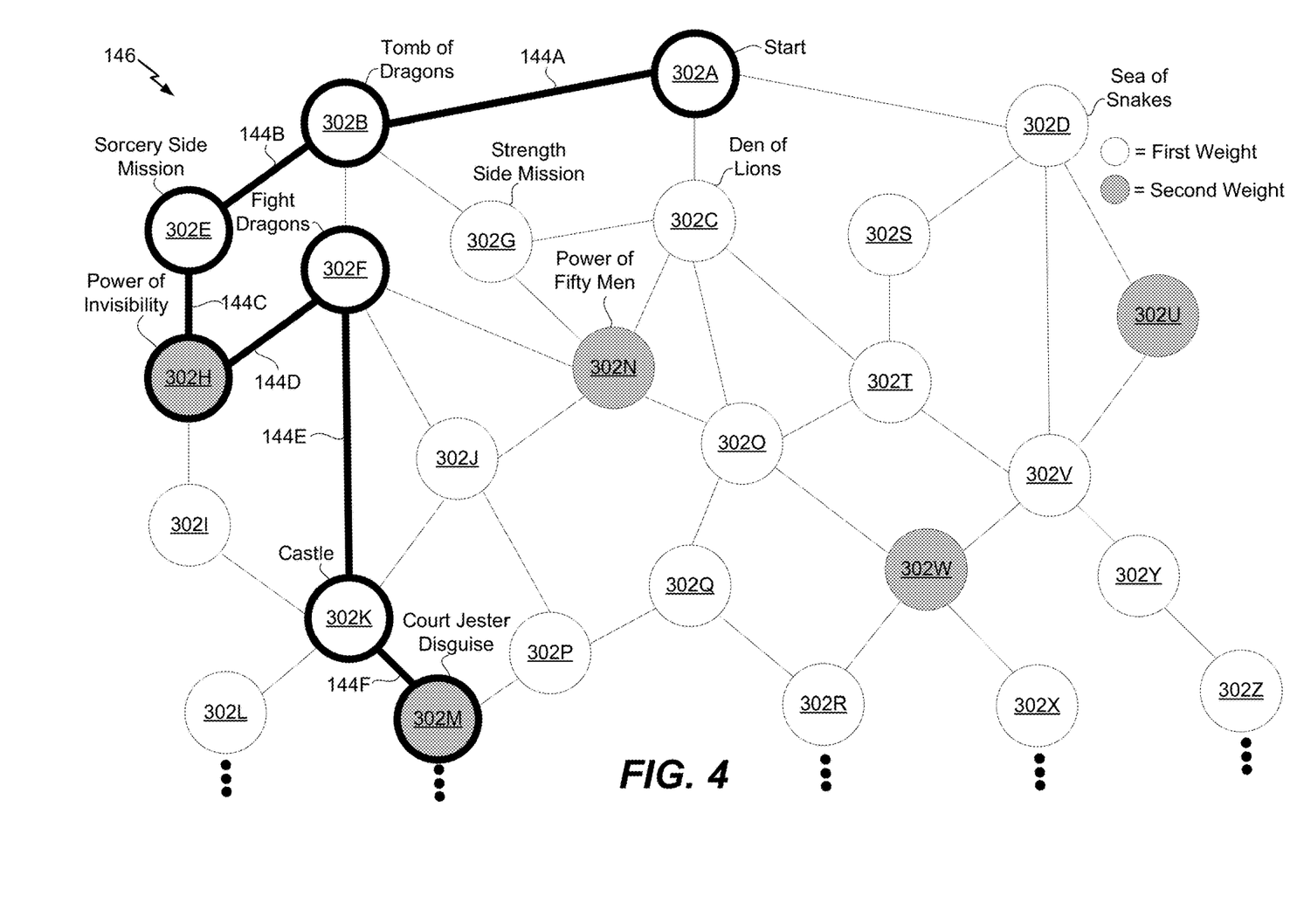
FIG. 4 is an example of linking nodes in the data structure based on user-performed actions.

Referring back to FIG. 1, the node linking unit 114 is configured to link different nodes 302 of the plurality of nodes 302 based on the statistics 126 to generate sequential action data 146. For example, the node linking unit 114 can link the nodes 302 of the data structure 300 according to the sequential order of user-performed actions to generate the sequential action data 146. Referring to FIG. 4, a non-limiting example of the sequential action data 146 is shown. For example, the node 302A is linked to the node 302B, the node 302B is linked to the node 302E, the node 302E is linked to the node 302H, the node 302H is linked to the node 302F, the node 302F is linked to the node 302K, and the node 302K is linked to the node 302M. As explained below, the sequential action data 146 is used by the recap generator 118 to generate a recap 150 of the user-performed actions 144.

The character profile generator 116 is configured to process at least a portion of the statistics to generate character profile data 148. To illustrate, character profile rules 124 (e.g., a set of rules) are stored at the memory 104. The character profile generator 116 applies the character profile rules 124 to the statistics 126 to determine the character profile data 148. The character profile data 148 indicates user preferences (e.g., playing styles or how the user plays the game) that are determined based on the user-performed actions 144 and weights assigned to different nodes 302 according to the character profile rules 124.

For example, the character profile rules 124 indicate a weight for each node 302 of the plurality of nodes 302. Referring to FIGS. 3-4, according to the character profile rules 124, a first weight is applied to the unshaded nodes 302 and a second weight is applied to the shaded nodes 302. To illustrate, the processor 102 applies the second weight to nodes 302H, 302M, 302N, 302U, 302W and applies the first weight to the other nodes 302. The second weight is applied to the nodes 302 that are associated with the user preferences (e.g., play styles), and the first weight is applied to the nodes 302 that correspond to events. The second weight is applied to the nodes 302 that are more highly associated with how the user plays the game (e.g., the user's playing style) as compared to events experienced by the user. As a non-limiting example, the second weight is applied to nodes 302 that are associated with special powers or abilities that the user has acquired, such as the "Power of Invisibility," the "Power of Fifty Men," the ability to disguise a court jester, etc., and the first weight is applied to nodes that are associated with events experienced by the user, such as fighting dragons, entering a castle, etc.

In the illustrative example, the second weight is applied to the node 302H because the node 302H, if linked according to the sequential action data 146, indicates that the user's character has the "Power of Invisibility". In a similar manner, the second weight is applied to the node 302M because the node 302M, if linked according to the sequential action data 146, indicates that the user's character has the ability to disguise as a court jester. Similarly, the second weight is applied to the node 302N (e.g., the node attributing the character with the power of fifty men), the node 302U, and the node 302W.

In the illustrative example, the first weight is applied to the node 302B because the node 302B, if linked according to the sequential action data 146, indicates that the user's character entered the "Tomb of Dragons." In a similar manner, the first weight is applied to the node 302E because the node 302E, if linked according to the sequential action data 146, indicates that the user's character performed the sorcery side mission. Similarly, the first weight is applied to the other unshaded nodes 302.

According to the implementation of FIGS. 3-4, the second weight is greater than the first weight. Because the second weight is greater than the first weight, the nodes 302 that are assigned the second weight have a greater impact on the character profile data 148 than the nodes that are assigned the first weight. For example, the character profile rules 124 are based largely on choices (e.g., user decisions) that are associated with how the user plays the game (e.g., the user's playing style) as opposed to events experienced by the user within the computer-generated interactive environment 142.

Additionally, the user preferences indicated by the character profile data 148 are based on the frequency of each particular type of user-performed action 144. For example, the character profile data 148 indicates a user preference based on the frequency of the first type of user-performed action 130 and the frequency of the second type of user-performed action 132. User-performed actions 144 that occur frequently are used to indicate user preferences. As a non-limiting example, if the user frequently uses the "Power of Invisibility," the character profile data 148 can indicate that the user's playing style is to frequently use the "Power of Invisibility."

The recap generator 118 is configured to generate the recap 150 of the user-performed actions 144 based on the sequential action data 146 and the character profile data 148. According to one implementation, the recap 150 can include a video recap that includes a summary of the user-performed actions 144 according to the sequential action data 146 and a summary of the user's playing style according to the character profile data 148. For example, the summary of the user-performed actions 144 can include a video recap of the user entering the "Tomb of Dragons" and other events, and the summary of the user's playing style can include a video tutorial on how to use (e.g., activate) the "Power of Invisibility." According to another implementation, the recap 150 can include a text-based recap that includes a summary of the user-performed actions 144 according to the sequential action data 146 and a summary of the user's playing style according to the character profile data 148. The text-based summary of the user's playing style can indicate what buttons to press on the input device 106 to activate the "Power of Invisibility." According to another implementation, the recap 150 can include an interactive tutorial on how to activate the "Power of Invisibility." The processor 102 provides the recap 150 to the display device 108, and the display device 108 displays the recap 150.

The techniques described with respect to FIGS. 1-4 enable generation of a quick tutorial (or overview) of a video game or other computer-generated interactive environment. The tutorial is constructed based on various decision trees (e.g., the data structure 300) indicating the user's preferences. To illustrate, the decision trees outline different specialization routes and user preferences within the computer-generated interactive environment 142. As different user-performed actions 144 are performed and logged by the user action logger 110, the decision trees are traversed and become increasingly accurate in representing the user's preferences. Because some decisions are of particular importance, such as character specialization decisions, such decisions are weighted differently than less important decisions. For example, each node 302 of the data structure 300 is assigned a weight based on that node's importance. The highest weighted decisions (e.g., nodes 302) that are linked according to the sequential action data 146 is used to generate the recap 150. Additionally, because the user can perform certain actions 144 more frequently than other actions, the user-performed actions 144 that are performed most frequently are also used to generate the recap 150.

Figure 5:
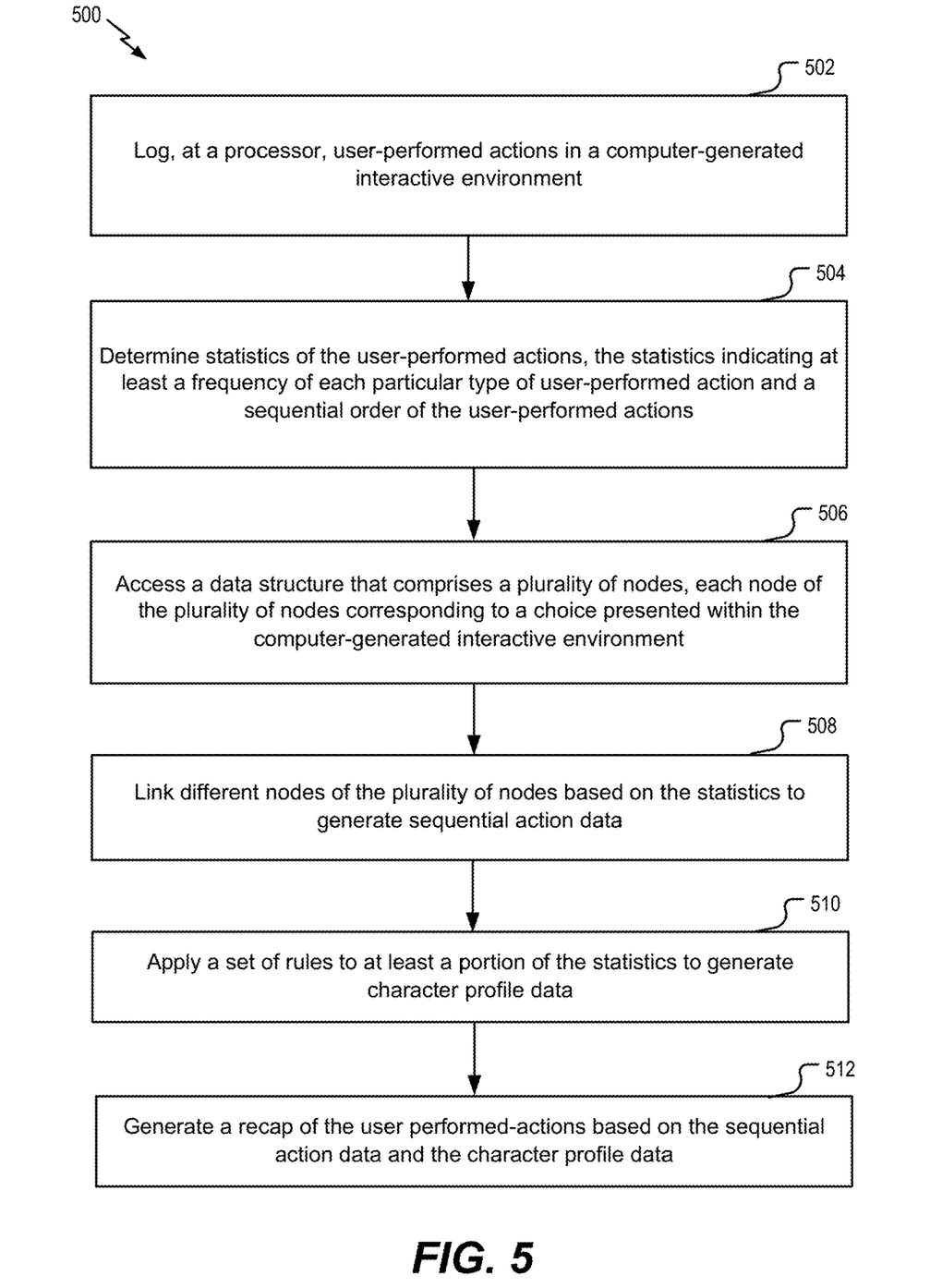
FIG. 5 is a flowchart of a method for summarizing actions performed in a computer-generated interactive environment.

FIG. 5 is a flowchart of a method 500 for summarizing actions performed in a computer-generated interactive environment. The method 500 can be performed by the system 100 of FIG. 1. For example, the processor 102 can perform operations described in the method 500.

The method 500 includes logging, at a processor, user-performed actions in a computer-generated interactive environment, at 502. For example, the user action logger 110 logs the user-performed actions 144 in the computer-generated interactive environment 142. To illustrate, the user action logger 110 can log the user-performed actions 144 in "real-time" to create the user action log 160 that is stored at the memory 104.

The method 500 also includes determining statistics of the user-performed actions, at 504. The statistics indicate at least a frequency of each particular type of user-performed action and a sequential order of the user-performed actions. For example, the statistics generator 112 determines the statistics 126 for the user-performed actions 144. To illustrate, the statistics generator 112 can access the user action log 160 from the memory 104 and generate the statistics 126 from the user-performed actions 144 recorded in the user action log 160. For example, the statistics generator 112 can determine the sequential order of the user-performed actions 128. The sequential order of the user-performed actions 128 can indicate that the second user-performed action 144B was performed after the first user-performed action 144A, the third user-performed action 144C was performed after the second user-performed action 144B, etc. Additionally, the statistics generator 112 can also determine the frequency of each particular type of user-performed action. In a non-limiting example, the first type of user-performed action corresponds to the player activating the "Power of Invisibility" as indicated in the fourth user-performed action 144D, and the statistics generator 112 determines a frequency of the first type of user-performed action 130 by tracking how many time the "Power of Invisibility" is used.

The method 500 also includes accessing a data structure that includes a plurality of nodes, at 506. Each node of the plurality of nodes corresponds to a choice presented within the computer-generated interactive environment. For example, the processor 102 accesses the data structure 300. According to one implementation, the data structure 300 corresponds to a decision tree. The data structure 300 includes the plurality of nodes 302, and each node 302A-302Z of the plurality of nodes 302 can correspond to a decision within the computer-generated interactive environment 142 that is made based on a corresponding user-performed action 144.

The method 500 also includes linking different nodes of the plurality of nodes based on the statistics to generate sequential action data, at 508. For example, the node linking unit 144 links different nodes 302 of the plurality of nodes 302 based on the statistics 126 to generate the sequential action data 146. For example, the node linking unit 114 can link the nodes 302 of the data structure 300 according to the sequential order of user-performed actions to generate the sequential action data 146. To illustrate, the node 302A is linked to the node 302B, the node 302B is linked to the node 302E, the node 302E is linked to the node 302H, the node 302H is linked to the node 302F, the node 302F is linked to the node 302K, and the node 302K is linked to the node 302M.

The method 500 also includes applying a set of rules to at least a portion of the statistics to generate character profile data, at 510. For example, the character profile generator 116 applies the character profile rules 124 to at least a portion of the statistics 126 to generate the character profile data 148. The character profile data 148 indicates user preferences (e.g., playing styles or how the user plays the game) that are determined based on the user-performed actions 144 and weights assigned to different nodes 302 according to the character profile rules 124. For example, according to the character profile rules 124, a weight is applied to each node 302 of the plurality of nodes 302. To illustrate, according to the character profile rules 124, the processor 102 applies the second weight to the nodes 302H, 302M, 302N, 302U, 302W and applies the first weight to the other nodes 302. The second weight is applied to the nodes 302 that are associated with the user preferences. The first weight is applied to the nodes 302 that correspond to events. As a non-limiting example, the first weight is applied to the nodes 302 that are associated with events experienced by the user within the computer-generated interactive environment 142. The second weight is greater than the first weight. Because the second weight is greater than the first weight, the nodes 302 that are assigned the second weight have a greater impact on the character profile data 148 than the nodes that are assigned the first weight. For example, the second weight is associated with nodes that are largely indicative of choices (e.g., user decisions) that are associated with how the user plays the game (e.g., the user's playing style) as opposed to events experienced by the user within the computer-generated interactive environment 142. Additionally, the user preferences indicated by the character profile data 148 is based on the frequency of each particular type of user-performed action 144. For example, according to the set of rules (e.g., the character profile rules 124), the processor 102 applies different weights to each user-performed action based on the frequency of each particular type of user-performed action 144 (e.g., based on the frequency of the first type of user-performed action 130 and the frequency of the second type of user-performed action 132). User-performed actions 144 that occur frequently are used to indicate user preferences. As a non-limiting example, if the user frequently uses the "Power of Invisibility," the character profile data 148 can indicate that the user's playing style is to frequently use the "Power of Invisibility."

The method 500 also includes generating a recap of the user-performed actions based on the sequential action data and the character profile data, at 512. For example, the recap generator 118 generates the recap 150 of the user-performed actions 144 based on the sequential action data 126 and the character profile data 148. According to one implementation, the recap 150 includes a video recap that includes a summary of the user-performed actions 144 according to the sequential action data 146 and a summary of the user's playing style according to the character profile data 148. For example, the summary of the user-performed actions 144 can include a video recap of the user entering the "Tomb of Dragons" and other events, and the summary of the user's playing style can include a video tutorial on how to use (e.g., activate) the "Power of Invisibility." According to another implementation, the recap 150 can include a text-based recap that includes a summary of the user-performed actions 144 according to the sequential action data 146 and a summary of the user's playing style according to the character profile data 148. The text-based summer of the user's playing style can indicate what buttons to press on the input device 106 to activate the "Power of Invisibility." According to another implementation, the recap 150 can include an interactive tutorial on how to activate the "Power of Invisibility." The processor 102 provides the recap 150 to the display device 108, and the display device 108 displays the recap 150.

The method 500 enables generation of a quick tutorial (or overview) that is constructed based on various decision trees (e.g., the data structure 300) indicating the user's preference. To illustrate, the decision trees outline different specialization routes and user preferences within the computer-generated interactive environment 142. As different user-performed actions 144 are performed and logged by the user action logger 110, the decision trees are traversed and become increasingly accurate in representing the user's preferences. Because some decisions are of particular importance, such as character specialization decisions, decisions of the decision tree are weighted differently. For example, each node 302 of the data structure 300 is assigned a weight based on the importance. The highest weighted decisions (e.g., nodes 302) that are linked according to the sequential action data 146 are used to generate the recap 150. Additionally, because the user can perform certain actions 144 more frequently, the user-performed actions 144 performed most frequently are also used to generate the recap 150.

The present invention may be a system, a method, and/or a computer program product at any possible technical detail level of integration. The computer program product may include a computer readable storage medium (or media) having computer readable program instructions thereon for causing a processor (or controller) to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or eight source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other devices to cause a series of operational steps to be performed on the computer, other programmable apparatus or other devices to produce a computer implemented process, such that the instructions which execute on the computer, other programmable apparatus, or other devices implement the functions/acts specified in the flowchart and/or block diagram block or blocks.

It is to be understood that the techniques of this disclosure can be implemented using cloud computing. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The characteristics include on-demand self-service, broad network access, resource pooling, rapid elasticity, and measured service. According to on-demand self-service, a cloud consumer can unilaterally provision computing capabilities, such as server time and network storage, as needed automatically without requiring human interaction with the service's provider. According to broad network access, capabilities are available over a network and accessed through standard mechanisms that promote use by heterogeneous thin or thick client platforms (e.g., mobile phones, laptops, and PDAs). According to resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). According to rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. According to measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The service models include Software as a Service (SaaS), Platform as a Service (PaaS), and Infrastructure as a Service (IaaS). According to SaaS, the capability provided to the consumer is to user the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. According to PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. According to IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models include a private cloud, a community cloud, a public cloud, and a hybrid cloud. According to the private cloud, the cloud infrastructure is operated solely for an organization. It may be managed by the organization or a third party and may exist on-premises or off-premises. According to the community cloud, the cloud infrastructure is shared by several organizations and supports a specific community that has shared concerns (e.g., mission, security requirements, policy, and compliance considerations). It may be managed by the organizations or a third party and may exist on-premises or off-premises. According to the public cloud, the cloud infrastructure is made available to the general public or a large industry group and is owned by an organization selling cloud services. According to the hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
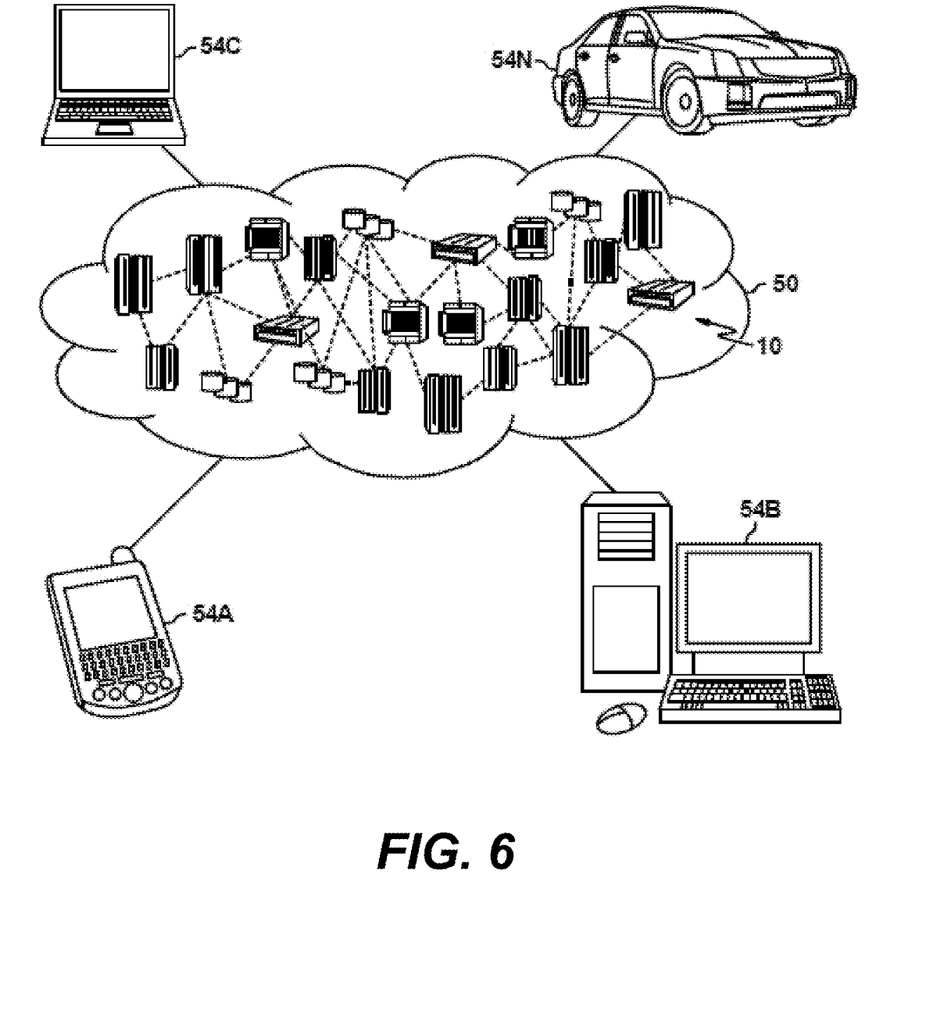
FIG. 6 is a diagram of an illustrative example of a cloud computing environment.

Referring now to FIG. 6, an illustrative cloud computing environment 50 is depicted. As shown, the cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
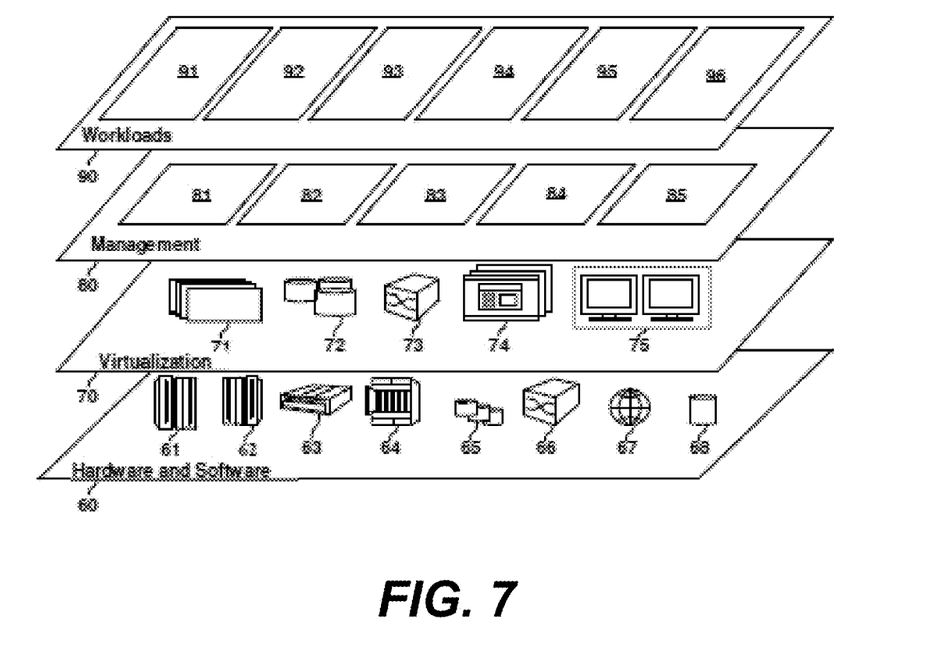
FIG. 7 is a diagram of a set of functional abstraction layers provided by the cloud computing environment.

Referring now to FIG. 7, a set of functional abstraction layers provided by cloud computing environment 50 is shown. It should be understood in advance that the components, layers, and functions shown in FIG. 7 are intended to be illustrative only and embodiments of the invention are not limited thereto.

Hardware and software layer 60 includes hardware and software components. Examples of hardware components include: mainframes 61; Reduced Instruction Set Computer (RISC) architecture based servers 62; servers 63; blade servers 64, storage devices 65; and networks and networking components 66. In some embodiments, software components include network application server software 67 and database software 68.

Virtualization layer 70 provides an abstraction layer form which the following examples of virtual entities may be provided: virtual servers 71; virtual storage 72; virtual networks 73; including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing; and candidate query name generation processing 96.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
   logging, at a processor, user-performed actions in a computer-generated interactive environment;
   determining statistics of the user-performed actions, the statistics indicating at least a frequency of each particular type of user-performed action and a sequential order of the user-performed actions;
   accessing a data structure that comprises a plurality of nodes, each node of the plurality of nodes corresponding to a choice presented within the computer-generated interactive environment;
   linking different nodes of the plurality of nodes based on the statistics to generate sequential action data;
   applying a set of rules to at least a portion of the statistics to generate character profile data;
   applying a weight to nodes of the plurality of nodes according to the set of rules, wherein, according to the set of rules, one or more different weights are applied to each of the user-performed actions based on the frequency of each particular type of user-performed action, and wherein the frequency of each of the particular type of user-performed actions indicate a user playing style associated with a particular type of corresponding event; and
   generating a recap of the user-performed actions based on the sequential action data and the character profile data, wherein the recap of the user-performed actions includes a video recap of the particular type of corresponding event, and an interactive tutorial of how to perform each of the particular type of user-performed actions associated with the particular type of corresponding event.

2. The method of claim 1, wherein the computer-generated interactive environment is associated with a video game.

3. The method of claim 1, wherein the data structure corresponds to a decision tree.

4. The method of claim 1, wherein a first weight is applied to nodes that correspond to events within the computer-generated interactive environment, and wherein a second weight is applied to nodes that are associated with user preferences.

5. The method of claim 4, wherein the second weight is greater than the first weight.

6. The method of claim 1, wherein the recap of the user-performed actions includes a summary of a user playing style.

7. An apparatus comprising:
a memory; and
a processor coupled to the memory, the processor configured to:
log user-performed actions in a computer-generated interactive environment;
determine statistics of the user-performed actions, the statistics indicating at least a frequency of each particular type of user-performed action and a sequential order of the user-performed actions;
access a data structure that comprises a plurality of nodes, each node of the plurality of nodes corresponding to a choice presented within the computer-generated interactive environment;
link different nodes of the plurality of nodes based on the statistics to generate sequential action data;
apply a set of rules to at least a portion of the statistics to generate character profile data;
apply a weight to nodes of the plurality of nodes according to the set of rules, wherein, according to the set of rules, one or more different weights are applied to each of the user-performed actions based on the frequency of each particular type of user-performed action, and wherein the frequency of each of the particular type of user-performed actions indicate a user playing style associated with a particular type of corresponding event; and
generate a recap of the user-performed actions based on the sequential action data and the character profile data, wherein the recap of the user-performed actions includes a video recap of the particular type of corresponding event, and an interactive tutorial of how to perform each of the particular type of user-performed actions associated with the particular type of corresponding event.

8. The apparatus of claim 7, wherein the computer-generated interactive environment is associated with a video game.

9. The apparatus of claim 7, wherein the data structure corresponds to a decision tree.

10. The apparatus of claim 7, wherein a first weight is applied to nodes that correspond to events within the computer-generated interactive environment, and wherein a second weight is applied to nodes that are associated with user preferences.

11. The apparatus of claim 10, wherein the second weight is greater than the first weight.

12. The apparatus of claim 7, wherein the recap of the user-performed actions includes a summary of a user playing style.

13. A computer program product for generating a user-specific recap, the computer program product comprising:
one or more non-transitory computer readable storage devices and program instructions stored on the one or more non-transitory computer readable storage devices, the program instructions comprising:
program instructions to log user-performed actions in a computer-generated interactive environment;
program instructions to determine statistics of the user-performed actions, the statistics indicating at least a frequency of each particular type of user-performed action and a sequential order of the user-performed actions;
program instructions to access a data structure that comprises a plurality of nodes, each node of the plurality of nodes corresponding to a choice presented within the computer-generated interactive environment;
program instructions to link different nodes of the plurality of nodes based on the statistics to generate sequential action data;
program instructions to apply a set of rules to at least a portion of the statistics to generate character profile data;
program instructions to apply a weight to nodes of the plurality of nodes according to the set of rules, wherein, according to the set of rules, one or more different weights are applied to each of the user-performed actions based on the frequency of each particular type of user-performed action, and wherein the frequency of each of the particular type of user-performed actions indicate a user playing style associated with a particular type of corresponding event; and
program instructions to generate a recap of the user-performed actions based on the sequential action data and the character profile data, wherein the recap of the user-performed actions includes a video recap of the particular type of corresponding event, and an interactive tutorial of how to perform each of the particular type of user-performed actions associated with the particular type of corresponding event.

14. The computer program product of claim 13, wherein the computer-generated interactive environment is associated with a video game.

15. The computer program product of claim 13, wherein the data structure corresponds to a decision tree.

* * * * *